(12) United States Patent
Ishizawa et al.

(10) Patent No.: US 8,435,320 B2
(45) Date of Patent: May 7, 2013

(54) CERAMIC HONEYCOMB FILTER

(75) Inventors: Toshitaka Ishizawa, Moka (JP);
Kenichiro Sekiguchi, Moka (JP);
Masakazu Konomi, Moka (JP)

(73) Assignee: Hitachi Metals, Ltd., Tokyo (JP)

( * ) Notice: Subject to any disclaimer, the term of this patent is extended or adjusted under 35 U.S.C. 154(b) by 268 days.

(21) Appl. No.: 12/281,432

(22) PCT Filed: Aug. 30, 2007

(86) PCT No.: PCT/JP2007/066856
§ 371 (c)(1),
(2), (4) Date: Sep. 2, 2008

(87) PCT Pub. No.: WO2008/026675
PCT Pub. Date: Mar. 6, 2008

(65) Prior Publication Data
US 2009/0025349 A1    Jan. 29, 2009

(30) Foreign Application Priority Data

Aug. 30, 2006 (JP) ................................ 2006-232936
Mar. 9, 2007 (JP) ................................ 2007-060188

(51) Int. Cl.
*B01D 24/00* (2006.01)
*B01D 39/14* (2006.01)
*B01D 39/06* (2006.01)
*B01D 50/00* (2006.01)

(52) U.S. Cl.
USPC ................ 55/523; 55/522; 55/524; 422/169; 422/170; 422/171; 422/172; 422/177; 422/178; 422/179; 422/180; 422/181; 422/182

(58) Field of Classification Search ............ 55/522–524; 422/168–172, 177–182
See application file for complete search history.

(56) References Cited

U.S. PATENT DOCUMENTS

| | | | |
|---|---|---|---|
| 6,206,944 | B1 | 3/2001 | Hickman |
| 7,001,861 | B2 * | 2/2006 | Beall et al. ..................... 501/128 |
| 7,052,532 | B1 * | 5/2006 | Liu et al. ......................... 96/154 |
| 7,754,160 | B2 * | 7/2010 | Miyairi et al. ................. 422/180 |
| 2002/0004445 | A1 | 1/2002 | Beall et al. |
| 2003/0110744 | A1 * | 6/2003 | Gadkaree et al. ............... 55/523 |
| 2003/0165662 | A1 | 9/2003 | Suwabe et al. |
| 2003/0166450 | A1 * | 9/2003 | Kumazawa et al. .......... 501/119 |

(Continued)

FOREIGN PATENT DOCUMENTS

| | | |
|---|---|---|
| EP | 1818098 A1 | 8/2007 |
| EP | 1920838 A1 | 5/2008 |

(Continued)

OTHER PUBLICATIONS

Supplementary European Search Report issued in Application No. 07806333.6 dated Apr. 10, 2012.

*Primary Examiner* — Amber Orlando
(74) *Attorney, Agent, or Firm* — Sughrue Mion, PLLC

(57) ABSTRACT

A ceramic honeycomb filter comprising a honeycomb structure having a large number of flow paths partitioned by porous cell walls; and plugs formed in the flow paths alternately on the exhaust gas inlet and outlet sides; the thickness W (mm) and permeability $\kappa$ ($\mu m^2$) of the cell wall and the length L (mm) and cross section area A ($mm^2$) perpendicular to the length direction of the flow path meeting the relations of $0.1 \leq W \leq 0.5$, $8 \leq \kappa/W \leq 26.7$, and $125 \leq L/A^{0.5} \leq 360$.

4 Claims, 6 Drawing Sheets

U.S. PATENT DOCUMENTS

| | | | |
|---|---|---|---|
| 2004/0148916 A1* | 8/2004 | Merkel | 55/523 |
| 2004/0161373 A1* | 8/2004 | Ichikawa et al. | 422/180 |
| 2004/0261384 A1* | 12/2004 | Merkel et al. | 55/523 |
| 2006/0191248 A1* | 8/2006 | Bardhan et al. | 55/523 |
| 2006/0193756 A1* | 8/2006 | Suzuki et al. | 422/177 |
| 2007/0044444 A1 | 3/2007 | Oshimi | |
| 2007/0048494 A1 | 3/2007 | Miyairi et al. | |
| 2007/0049492 A1* | 3/2007 | Miyairi et al. | 502/439 |

FOREIGN PATENT DOCUMENTS

| | | |
|---|---|---|
| JP | 09-299811 A | 11/1997 |
| JP | 2002-239322 A | 8/2002 |
| JP | 2003-040687 A | 2/2003 |
| JP | 2003-515023 A | 4/2003 |
| JP | 2003-236322 A | 8/2003 |
| JP | 2003-534229 A | 11/2003 |
| JP | 2005-511294 A | 4/2005 |
| JP | 2006-096634 A | 4/2006 |
| WO | 0191882 A1 | 12/2001 |
| WO | 03/074848 A1 | 9/2003 |

\* cited by examiner

Fig. 8(a)   CONVENTIONAL
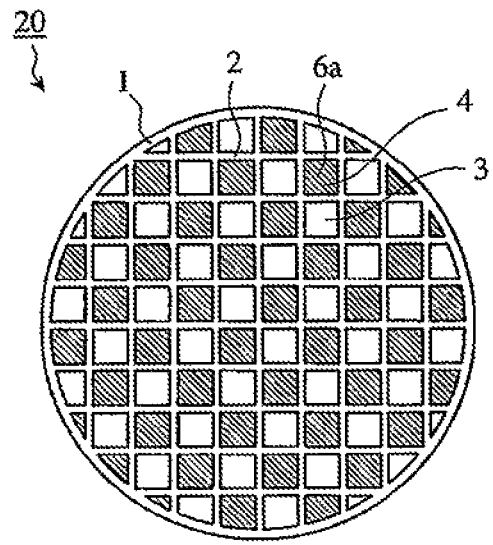
Fig. 8(b)   CONVENTIONAL
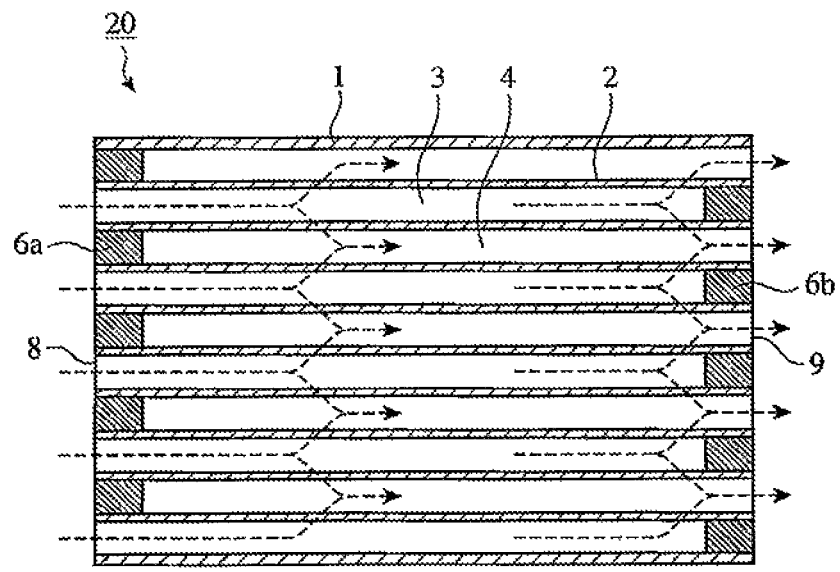

CERAMIC HONEYCOMB FILTER

CROSS REFERENCE TO RELATED APPLICATIONS

This application is a National Stage of International Application No. PCT/JP2007/066856 filed Aug. 30, 2007, claiming priority based on Japanese Patent Application Nos. 2006-232936, filed Aug. 30, 2006, and 2007-060188, filed Mar. 9, 2007, the contents of all of which are incorporated herein by reference in their entirety.

FIELD OF THE INVENTION

The present invention relates to a ceramic honeycomb filter used for purifying particulate-matter-containing exhaust gases emitted from diesel engines.

BACKGROUND OF THE INVENTION

An exhaust gas emitted from diesel engines contains fine particles (particulate matter) based on carbon such as soot and high-boiling-point hydrocarbons. When such exhaust gas is released in the atmosphere, it may adversely affect human beings and the environment. For this reason, a ceramic honeycomb filter, which may be called "honeycomb filter" in short later, has been disposed in an exhaust pipe connected to a diesel engine to purify an exhaust gas by removing particulate matter. As shown in FIGS. 8(a) and 8(b), a conventional honeycomb filter 20 comprises a ceramic honeycomb structure comprising porous cell walls 2 forming a lot of flow paths 3, 4, and an outer peripheral wall 1, and plugs 6a, 6b alternately sealing both ends 8, 9 of the flow paths 3, 4 in a checkerboard pattern. The outer peripheral wall 1 of the honeycomb filter is fixed to a holding member (not shown) formed by a metal mesh or a ceramic mat, and placed in a metal container (not shown).

In the honeycomb filter 20, an exhaust gas flows into the flow paths 3 that are open at an exhaust-gas-entering-side end 8 and sealed at an exhaust-gas-exiting-side end, as shown by the dotted arrow. Particulate matter in the exhaust gas is captured by pores in the cell walls 2 while the exhaust gas passes through the pores. The purified exhaust gas exits from the flow paths 4 that are sealed at an exhaust-gas-entering-side end and open at an exhaust-gas-exiting-side end 9. As the particulate matter is continuously captured in the cell walls 2, the pores of the cell walls are clogged, resulting in increased pressure loss. The honeycomb filter is regenerated by burning the accumulated particulate matter by a burner or a heater. However, since energy is consumed to burn the particulate matter, a regeneration interval is preferably as long as possible. Required to that end are that the honeycomb filter has small initial pressure loss, and that the pressure loss of the honeycomb filter does not increase drastically after the honeycomb filter has captured particulate matter.

The honeycomb filter is required to have small pressure loss while maintaining high capturing efficiency of particulate matter. As schematically shown in FIG. 2, it is considered that the pressure loss of the honeycomb filter is a sum of an inlet loss P1 generated when an exhaust gas flows into the inlet-side end 8, an outlet loss P2 generated when the exhaust gas exits from the outlet-side end 9, a cell wall loss P3 generated when the exhaust gas passes through the cell walls 2, and a flow path loss P4 generated by friction with the cell walls while the exhaust gas flows through the flow paths 3, 4. The cell wall loss P3 is a major fraction of the pressure loss of the filter, in particular largely contributing to increase in the pressure loss after the particulate matter is captured. Accordingly, technologies have been proposed to reduce the cell wall loss.

JP 2003-40687 A discloses a honeycomb filter having a porosity of 55 to 65%, and an average pore size of 15 to 30 µm, the total area of pores exposed to a cell wall surface being 35% or more of the area of the cell wall. This reference describes that the adjustment of the porosity, etc. of cell walls makes it possible to have high particulate-matter-capturing efficiency and low pressure loss, and that the permeability of the cell walls influencing the cell wall loss P3 is preferably 1.5 to 6 µm². Although JP 2003-40687 A describes how to reduce the cell wall loss P3, it fails to teach the adjustment of the length and cross section area of flow paths to reduce the flow path loss P4.

JP 2002-239322 A discloses a porous ceramic honeycomb structure comprising cell walls having a thickness of 0.1 to 0.3 mm and a pitch of 1.4 to 3 mm, and flow paths each having a cross section area of 1.3 mm² or more and a side as long as 1.15 mm or more, the surface area of the filter per a unit volume being 7 cm²/cm³ or more. This reference describes that these adjusted parameters enable highly efficient capturing of particulate matter with low pressure loss, and that with too small a pitch of cell walls, the exhaust gas entering an inlet-side end 8 undergoes a large inlet loss P1. This description suggests that the outlet loss P2 also increases. However, JP 2002-239322 A fails to teach how the total pressure loss of the honeycomb filter changes when the pitch of cell walls is made as small as 3 mm or less, which leads to a smaller cell wall loss P3 and larger inlet and outlet losses P1, P2. With the flow path loss P4 not considered, it is impossible to know from the description of JP 2002-239322 A how the total pressure loss of the honeycomb filter changes, for instance, when the flow paths are elongated with the pitch of cell walls unchanged, although it increases the total area of cell walls 2, presumably leading to a smaller cell wall loss P3 and a larger flow path loss P4.

WO 2003/074848 discloses a honeycomb filter, in which the length 1 (mm) of a longer side of a cross section of each flow path and the length L (mm) of the flow path satisfy the relation of $60 \leq L/1 \leq 500$, and the surface roughness Ra of flow path walls is 100 µm or less. WO2003/074848 describes that there is a large flow path loss P4, when the flow paths are too long, or when the area of a cross section perpendicular to the longitudinal direction of each flow path, which may be called simply "cross section area of flow path," is too small (a small cell wall pitch with the cell wall thickness unchanged). However, no attention is paid to an increased flow path loss P4 and a decreased cell wall loss P3 due to an increased total area of cell walls, in the case of long flow paths or a small cell wall pitch, and it is not known from the description of WO 2003/074848 how the total pressure loss of the honeycomb filter changes by increase in the flow path loss P4 and decrease in the cell wall loss P3.

JP 2003-515023 A, a prior art reference indicating the relation between the length of flow paths and the pressure loss of a honeycomb filter, discloses a ceramic filter having a bulk density of at least about 0.50 g/cm³, and a length/diameter ratio not more than about 0.9. Showing the relation between the length of the honeycomb filter and its pressure loss when a cell wall thickness, a cell wall pitch and a honeycomb filter volume are constant, JP 2003-515023 A teaches that as the length of the honeycomb filter becomes smaller (in this case, the cross section area perpendicular to the flow paths increases because of a constant volume), the pressure loss of the honeycomb filter decreases. Namely, although the cell wall loss P3 does not change because of a constant total area of cell walls, the flow path loss P4 decreases as the flow paths become shorter, resulting in a decreased total pressure loss. When the length of the honeycomb filter (flow path length) changes with the cross section area of the honeycomb filter unchanged, the flow path loss P4 decreases, and the cell wall loss P3 increases. However, it is not known from the description of JP 2003-515023 A how the total pressure loss changes.

As described above, although it can be presumed from the cell wall pitch and the flow path length whether each of four types of loss P1 to P4 increases or decreases, it is not easy to determine how the pressure loss of the honeycomb filter obtained by totaling four types of loss changes.

JP 9-299811 A describes a honeycomb structure having a ratio L/d of a length L to a diameter d in a range of 0.4 to 1.3, a cell wall thickness of 0.1 mm or less, and the number of flow paths of 100/cm² or more. However, this honeycomb structure is not constructed to have reduced pressure loss despite high spalling resistance together with high exhaust-gas-cleaning performance. Accordingly, no hint can be obtained from JP 9-299811 A about how to design a cell wall pitch and a flow path length to reduce the pressure loss of the honeycomb filter.

As described above, although it can be presumed whether each of four types of loss P1 to P4 increases or decreases depending on the cell wall pitch and the flow path length, it is not easy to know how the pressure loss of the honeycomb filter, a total of the four types of loss, changes. Accordingly, the development of honeycomb filters has been conducted by a trial-and-error method of repeatedly producing various honeycomb filters until preferred properties are achieved.

The cell wall pitch and the flow path length affect temperature elevation while regenerating a honeycomb filter (burning particulate matter); the longer the flow paths, the higher the temperature near an exhaust-gas-exiting-side end 9, causing melting damage.

OBJECT OF THE INVENTION

Accordingly, an object of the present invention is to provide a honeycomb filter suffering less pressure loss and melting damage.

DISCLOSURE OF THE INVENTION

As a result of extensive investigation in view of the above object, the inventors have found that a honeycomb filter having less pressure loss and melting damage can be produced by regulating the relation between the cell wall thickness and permeability and the relation between the cross section area and the length of each flow path. The present invention has been completed based on such finding.

Thus, the ceramic honeycomb filter of the present invention comprises a honeycomb structure having a large number of flow paths partitioned by porous cell walls; and plugs formed in the flow paths alternately on the exhaust gas inlet and outlet sides; the thickness W (mm) and permeability κ (μm²) of the cell wall and the length L (mm) and cross section area A (mm²) perpendicular to the length direction of the flow path meeting the following relations:

$$0.1 \leq W \leq 0.5,$$

$$8 \leq \kappa/W \leq 26.7, \text{ and}$$

$$125 \leq L/A^{0.5} \leq 360.$$

The permeability κ (μm²) is preferably 2 or more.

The L and the cross section area S (mm²) perpendicular to the length direction of the honeycomb filter preferably satisfy the relation of $0.75 \leq L/S^{0.5} \leq 1.2$.

The length L is preferably 140 mm or more.

The distance between an outlet-side end of the inlet-side plug and an inlet-side end of the outlet-side plug is preferably 120 mm or more.

BRIEF DESCRIPTION OF THE DRAWINGS

FIG. 1(*b*) is a schematic, cross-sectional view (parallel to the flow paths) showing an example of the ceramic honeycomb filters of the present invention.

FIG. 3(*b*) is a graph showing another example of the relations between $L/A^{0.5}$ and pressure loss.

FIG. 3(*c*) is a graph showing a further example of the relations between $L/A^{0.5}$ and pressure loss.

FIG. 8(*a*) is a schematic, cross-sectional view (perpendicular to the flow paths) showing a conventional ceramic honeycomb filter.

FIG. 8(*b*) is a schematic, cross-sectional view (parallel to the flow paths) showing a conventional ceramic honeycomb filter.

DESCRIPTION OF THE BEST MODE OF THE INVENTION

[1] Function of the Present Invention

Figure 1A:
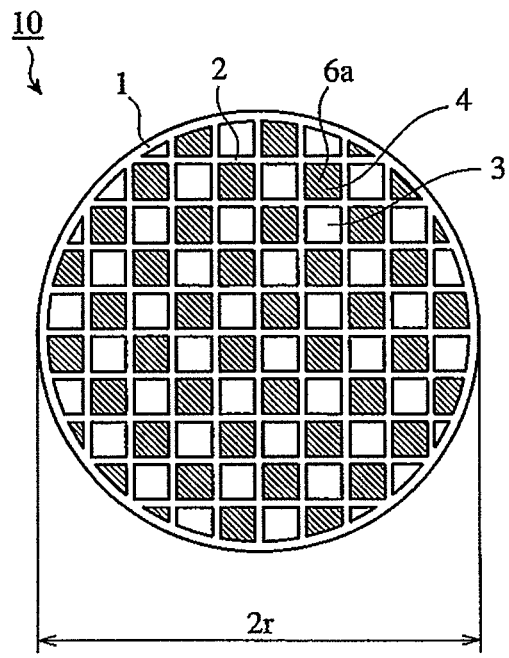
FIG. 1(*a*) is a schematic, cross-sectional view (perpendicular to the flow paths) showing an example of the ceramic honeycomb filters of the present invention.
Figure 1B:
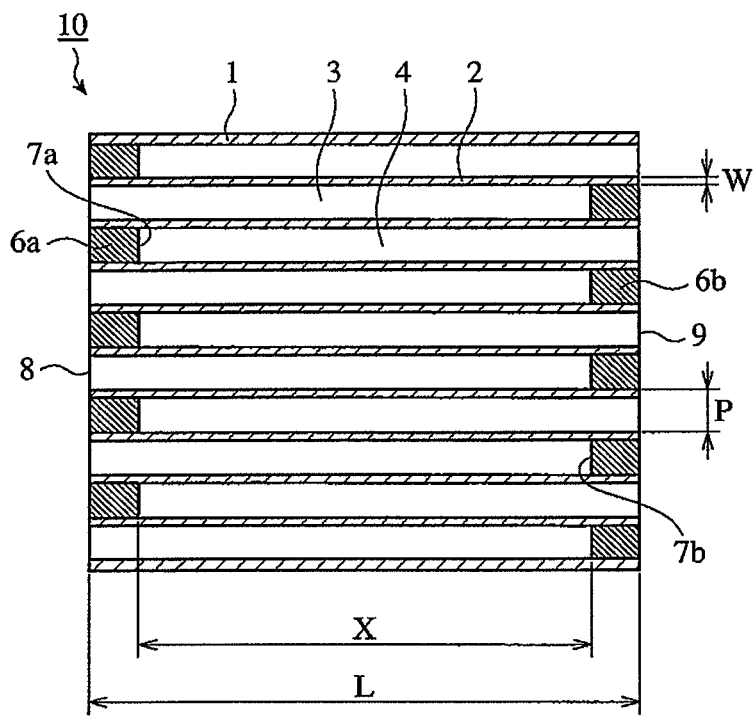
Figure 2:
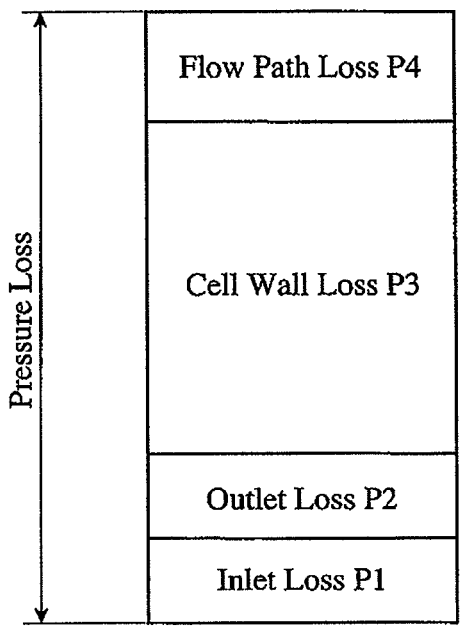
FIG. 2 is a schematic view showing each loss P1 to P4 constituting the pressure loss.

As shown in FIGS. 1(*a*) and 1(*b*), the honeycomb filter 10 of the present invention comprises an outer peripheral wall 1, a porous ceramic honeycomb structure disposed inside the outer peripheral wall 1 and having large numbers of outlet-side-sealed flow paths 3 and inlet-side-sealed flow paths 4 partitioned by orthogonal cell walls 2, and inlet-side plugs 6*a* and outlet-side plugs 6*b* alternately sealing an exhaust-gas-entering-side end 8 and an exhaust-gas-exiting-side end 9 in a checkerboard pattern.

(1) Cell Wall Thickness W

The cell wall 2 has a thickness W (mm) of 0.1 to 0.5 mm. When W is larger than 0.5 mm, a large cell wall loss P3 is generated, accompanied by increased inlet loss P1 and outlet loss P2, thereby increasing the pressure loss of the honeycomb filter. When W is less than 0.1 mm, the honeycomb filter has small strength, not suitable for practical applications.

(2) Permeability κ

The permeability κ (μm²) is represented by the formula (1):

$$\kappa = 1 \times 10^{-3} \eta \cdot Q \cdot W/(E \cdot P3) \tag{1},$$

wherein η is the viscosity (MPa·s) of the air at room temperature, W is the thickness (mm) of the cell wall, Q is the flow rate (m³/s) of a gas passing through the cell walls, E is the area (m²) of the cell walls through which a gas passes, and P3 is pressure difference in a cell wall thickness direction (cell wall loss, MPa). A method for measuring the permeability is described in JP 2003-534229 A. From the formula (1), the cell wall loss P3 can be expressed as $$P3 = (1 \times 10^{-3} \eta Q/E) \cdot W/\kappa \quad (2).$$

The cell wall loss P3 of the honeycomb filter is inversely proportional to κ/W. Larger κ/W leads to a smaller cell wall loss P3.

The cell walls 2 preferably have permeability κ of 2 μm² or more. The permeability κ of less than 2 μm² provides a large cell wall loss P3, resulting in the honeycomb filter with a large pressure loss. The permeability κ of the cell walls 2 is more preferably 4 μm² or more. Because the permeability κ of more than 10 μm² lowers the particulate-matter-capturing ratio, permeability κ is preferably 10 μm² or less. It is more preferably 8 μm² or less. The permeability κ is adjusted by the porosity and pore size of the cell walls. Specifically, it can be adjusted by controlling the amount of a pore-forming material such as a foamed resin added to the moldable material.

It is clear from the formula (1) that the cell wall loss P3 of the honeycomb filter is inversely proportional to the area E of the cell walls. Namely, a larger cell wall area provides a smaller cell wall loss P3. The area E of the cell walls is proportional to the flow path length L (length of the honeycomb filter), and inversely proportional to the cell wall pitch P. Because the cell wall pitch P is proportional to a square root of the cross section area A of the flow path, the area E of the cell walls is proportional to $L/A^{0.5}$, and the cell wall loss P3 is inversely proportional to $L/A^{0.5}$. Because a larger total area of cell walls provides a smaller amount of particulate matter captured per a unit cell wall area, resulting in smaller pressure loss (cell wall loss P3) increase after the particulate matter is captured.

Figure 3A:
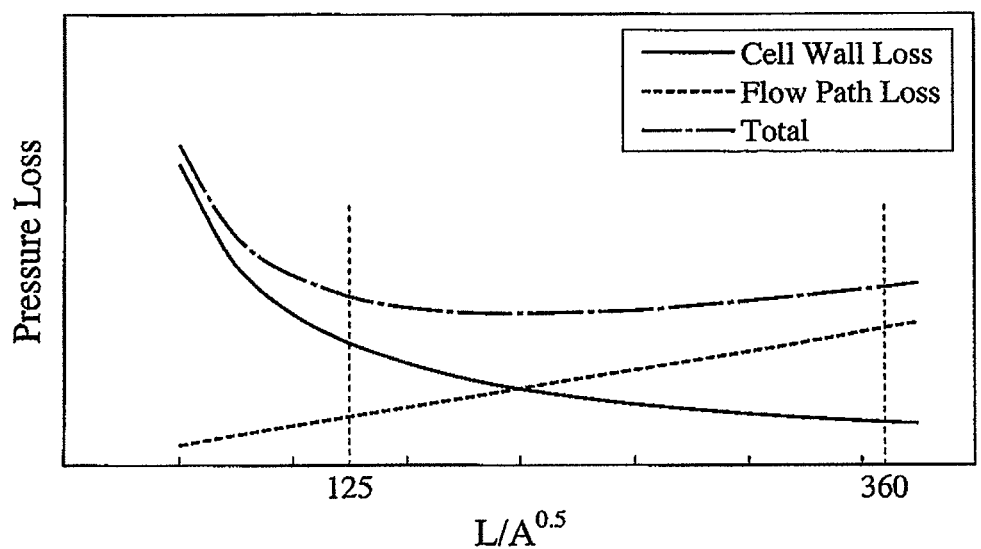
FIG. 3(*a*) is a graph showing an example of the relations between $L/A^{0.5}$ and pressure loss.
Figure 3B:
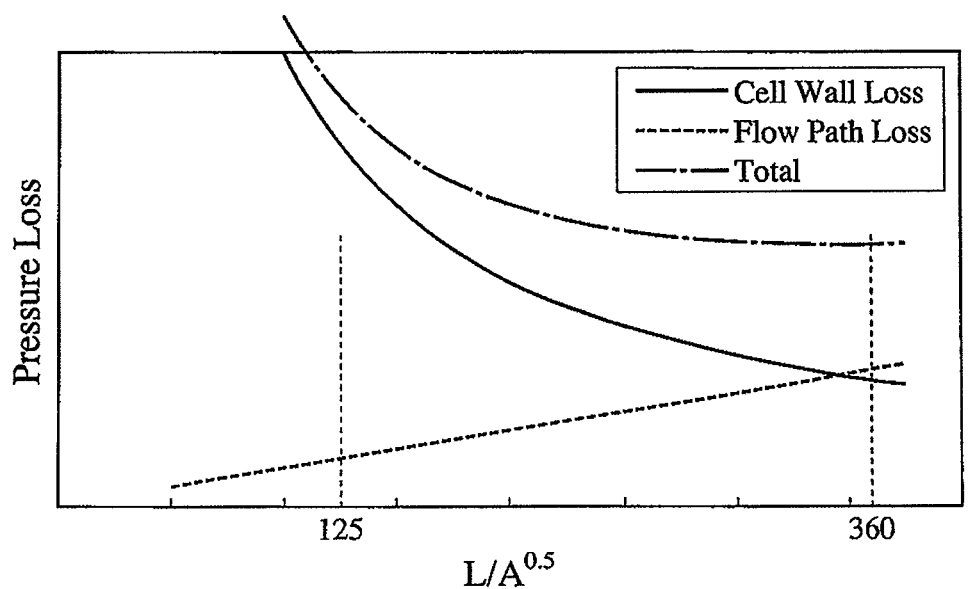
Figure 3C:
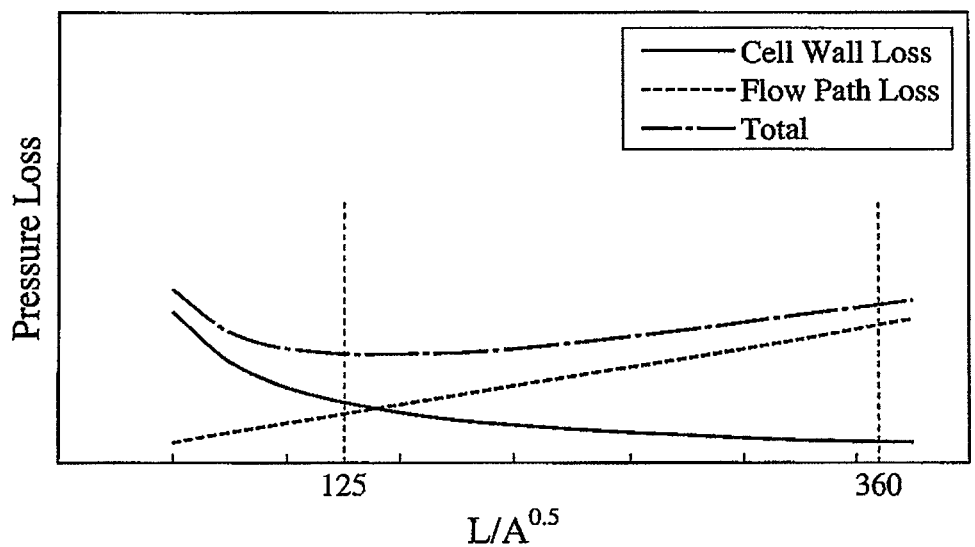

A larger flow path loss P4 is generated by a larger flow path length L and a smaller cross section area A of the flow path (smaller cell wall pitch P), and the flow path loss P4 is substantially proportional to $L/A^{0.5}$. FIG. 3(*a*) exemplifies the changes of the cell wall loss P3, the flow path loss P4 and their total when $L/A^{0.5}$ changes at a constant κ/W. There is a value of $L/A^{0.5}$ at which the pressure loss of the honeycomb filter (the cell wall loss P3+ the flow path loss P4) is minimum, indicating that a smaller pressure loss of the honeycomb filter cannot be obtained simply by reducing the cell wall pitch P while increasing the cell wall area, or by reducing the flow path length L. Too high $L/A^{0.5}$ provides the honeycomb filter with higher pressure loss.

(3) Ratio κ/W of Permeability to Cell Wall Thickness

The κ/W meets the relation of $8 \leq \kappa/W \leq 26.7$. FIG. 3(*b*) shows the relation between $L/A^{0.5}$ and pressure loss when the κ/W is smaller than in FIG. 3(*a*). Smaller κ/W provides a larger cell wall loss P3, resulting in the honeycomb filter with larger pressure loss [the cell wall loss P3+ the flow path loss P4]. Accordingly, too small κ/W, which provides the honeycomb filter with extremely large pressure loss, is not suitable for practical applications. The κ/W of 8 or more prevents increase in the pressure loss of the honeycomb filter.

FIG. 3(*c*) shows the relation between $L/A^{0.5}$ and pressure loss when the κ/W is larger than in FIG. 3(*a*). Larger κ/W provides a smaller cell wall loss P3, resulting in the honeycomb filter with smaller pressure loss (the cell wall loss P3+ the flow path loss P4). Accordingly, the κ/W is preferably as large as possible to reduce the pressure loss of the honeycomb filter. However, increase in the porosity and/or average pore size of the cell walls to increase the permeability κ, or the reduction of the cell wall thickness W deteriorates the strength of the honeycomb filter. Accordingly, too large κ/W is not suitable for practical applications because of the reduction of the honeycomb filter strength. For instance, when the cell walls having κ of 8 μm² (porosity of about 70%) are made thinner than 0.3 mm, the honeycomb filter has too low strength, not suitable for practical applications. Accordingly, the κ/W is 26.7 or less.

(4) Ratio $L/A^{0.5}$ of Flow Path Length to (Cross Section Area of Flow Path)$^{0.5}$ The ratio $L/A^{0.5}$ of the flow path length L (mm) to a square root of the cross section area A (mm²) of the flow path meets the relation of $125 \leq L/A^{0.5} \leq 360$. When the $L/A^{0.5}$ exceeds 360, the pressure loss of the honeycomb filter increases, causing melting damage at the time of regenerating the honeycomb filter. The regeneration of the honeycomb filter is conducted by burning particulate matter accumulated on cell wall surfaces by a high-temperature air supplied to the filter, and the flow path length L and the cross section area A of the flow path affect the temperature of the honeycomb filter during regeneration.

Figure 5:
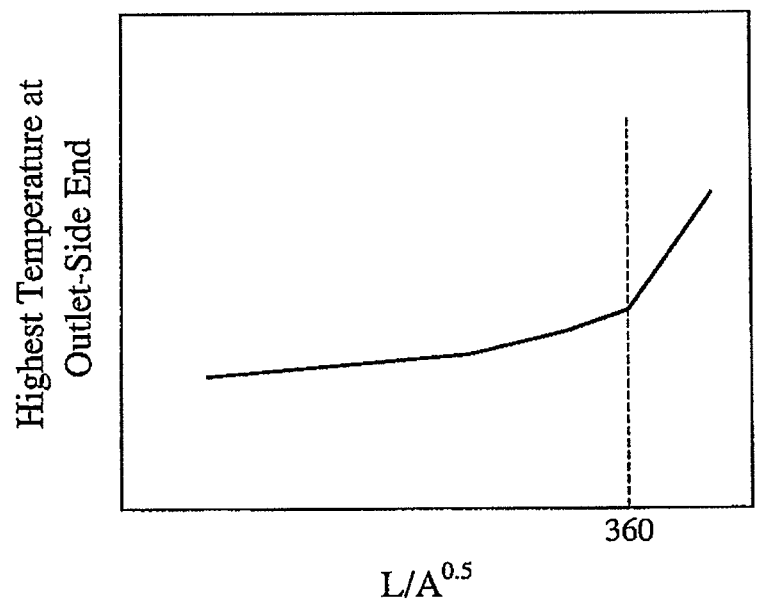
FIG. 5 is a graph showing the relation between $L/A^{0.5}$ and the highest temperature of the outlet-side end of the honeycomb filter while particulate matter is burned.

After a predetermined amount of particulate matter is captured in various honeycomb filters different only in the flow path length L, the particulate matter is burned by the air at 550° C. entering through the inlet-side end 8. FIG. 5 shows the relation between the value of $L/A^{0.5}$ and the highest temperature at the exhaust-gas-exiting-side end. When the $L/A^{0.5}$ increases, the highest temperature at the exhaust-gas-exiting-side end is elevated drastically. Namely, the longer the flow path length L, the higher the filter temperature, making it likely to cause melting damage. The smaller the cross section area A of the flow path, the larger the total area of cell walls, resulting in a reduced amount of particulate matter accumulated per a unit cell wall area. This leads to a larger contact area with the air and thus more efficient burning of particulate matter, resulting in rapid temperature elevation, and making it likely to cause melting damage in the honeycomb filter.

When the κ/W is 8 or more and the $L/A^{0.5}$ is 360 or less, the pressure loss of the honeycomb filter can be reduced in the present invention. When the (κ/W) is less than 8, the cell wall loss P3 is high. Accordingly, to reduce the pressure loss, it is necessary to increase the flow path length L or to reduce $A^{0.5}$ by reducing the cell wall pitch. However, a longer flow path length L causes the above problem of melting damage, and a smaller cell wall pitch increases a bulk density as described later.

Figure 4:
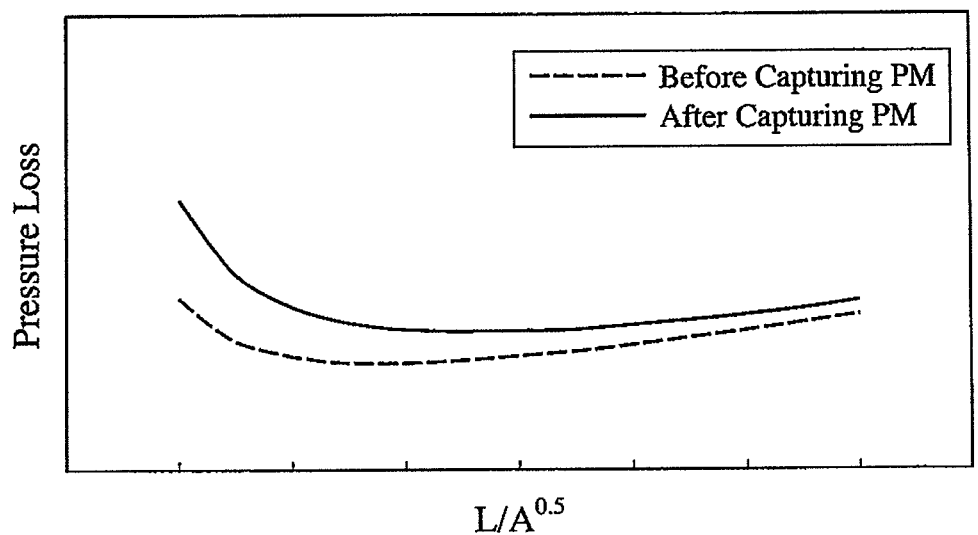
FIG. 4 is a graph showing an example of the relations between $L/A^{0.5}$ and pressure loss before and after capturing particulate matter.

As shown in FIG. 3(*a*), when $L/A^{0.5}$ becomes 125 or less, the pressure loss of the honeycomb filter drastically increases. As shown in FIG. 3(*c*), however, the use of a honeycomb filter with large κ/W reduces $L/A^{0.5}$, at which the total of the cell wall loss P3 and the flow path loss P4 is minimum. Accordingly, even if the length L of the honeycomb filter is reduced by increasing κ/W in a range of providing the honeycomb filter with enough strength, the pressure loss can sufficiently be made small. However, when the $L/A^{0.5}$ is small (small length L of the honeycomb filter and/or large cell wall pitch P), namely when the cell walls have a small total area, as shown in FIG. 4, the amount of particulate matter accumulated per a unit cell wall area rapidly increases during capturing the particulate matter, resulting in increase in the pressure loss of the honeycomb filter. Accordingly, the lower limit of $L/A^{0.5}$ is limited by pressure loss when the particulate matter is captured. Meeting $125 \leq L/A^{0.5}$, rapid increase in the pressure loss of the honeycomb filter can be prevented during capturing the particulate matter. Larger $L/A^{0.5}$ can suppress pressure loss increase during capturing the particulate matter, even if the honeycomb filter has a large initial pressure loss. Thus, $133.3 \leq L/A^{0.5}$ is preferable, $166 \leq L/A^{0.5}$ is more preferable, and $175 \leq L/A^{0.5}$ is most preferable.

All flow paths need not meet the condition of $125 \leq L/A^{0.5} \leq 360$, but half or more of them need only meet it in the present invention. More preferably, 80% or more of the flow paths meet this the condition.

(5) Ratio $L/S^{0.5}$ of Flow Path Length to (Filter Cross Section Area)$^{0.5}$ L and S preferably meet the condition of $0.75 \leq L/S^{0.5} \leq 1.2$, wherein S is the cross section area (mm$^2$) of the honeycomb filter perpendicular to the flow path length L (mm). When the cross section area A of the flow path is constant, a smaller cross section area S of the honeycomb filter provides a smaller number of the flow paths 3, 4, and thus the increased pressure loss of the honeycomb filter. Therefore, S is preferably as large as possible to reduce the pressure loss. A larger flow path length L provides a larger honeycomb filter volume, undesirably needing a mounting space in a vehicle. Meeting $L/S^{0.5} \leq 1.2$, increase in the pressure loss of the honeycomb filter can be prevented while avoiding increase in the honeycomb filter volume. Incidentally, $S^{0.5}$ is used to have the same dimension as L.

Too large a cross section area S of the honeycomb filter relative to the flow path length L is undesirable because it excessively increases the weight and volume of the honeycomb filter. Increase in the cross section area S of the honeycomb filter undesirably increases the pressure loss of the honeycomb filter. Larger S needs a larger diameter of a container for receiving the honeycomb filter. Because a gas flowing through an exhaust pipe expands and shrinks before and after passing through the honeycomb filter, a larger diameter of this container leads to a larger extent of gas expansion and shrinkage, resulting in larger pressure loss. With $0.75 \leq L/S^{0.5}$, increase in the pressure loss of the honeycomb filter can preferably be prevented, while avoiding increase in the volume and weight of the honeycomb filter. $0.87 \leq L/S^{0.5}$ is preferable, and $0.98 \leq L/S^{0.5}$ is more preferable. When $L/S^{0.5}$ is less than 0.98, $L/A^{0.5}$ is 210 or less, but the pressure loss of the honeycomb filter can be preferably reduced.

(6) Bulk Density

The honeycomb filter of the present invention preferably has a bulk density [honeycomb filter mass (g)/honeycomb filter volume (cm$^3$)] of less than 0.5 g/cm$^3$. When the bulk density is 0.5 g/cm$^3$ or more, the honeycomb filter has too large heat capacity. Thus, in the case of a catalyst-carrying honeycomb filter for burning particulate matter with a carried catalytic material, temperature elevation is slow by a heating means such as a high-temperature exhaust gas, an unburned fuel, etc., needing too long time to activate the catalytic material. Accordingly, the regeneration of the honeycomb filter cannot be conducted in a short period of time. Also, a large amount of a heating means such as a high-temperature exhaust or an unburned fuel should be supplied, resulting in poor fuel efficiency. The bulk density of the honeycomb filter is more preferably less than 0.4 g/cm$^3$. Because a smaller bulk density of the honeycomb filter is obtained by a larger cross section area of the flow path 3, 4, a smaller cell wall thickness W, and larger cell wall porosity, too small a bulk density provides the honeycomb filter with small strength, not suitable for practical applications. On the other hand, too large a bulk density excessively elevates the temperature of the honeycomb filter during regeneration, causing melting damage, and cracking due to large local temperature difference. Accordingly, the bulk density of the honeycomb filter is preferably 0.1 g/cm$^3$ or more, more preferably 0.3 g/cm$^3$ or more.

To reduce the bulk density of the honeycomb filter, the porosity of the outer peripheral wall 1 is preferably 30% or more, more preferably 35% or more. Because the outer peripheral wall 1 with too large porosity has low strength, not suitable for practical applications, the porosity of the outer peripheral wall 1 is preferably 80% or less, more preferably 60% or less. The outer peripheral wall 1 can be extrusion-molded integrally with the cell walls 2, or formed on an extrusion-molded ceramic honeycomb structure. In the latter case, the cell walls 2 and the outer peripheral wall 1 may have different porosities.

(7) Opening Ratio

The honeycomb filter preferably has an opening ratio of 30% or more at the exhaust-gas-entering-side end 8. The opening ratio of less than 30% provides a large inlet loss P1, resulting in the honeycomb filter with large pressure loss. The opening ratio is more preferably 34% or more. The opening ratio is a ratio of the total opening area of the outlet-side-sealed flow paths 3 to the area of the exhaust-gas-entering-side end 8.

(8) Flow Path Length L

Figure 6:
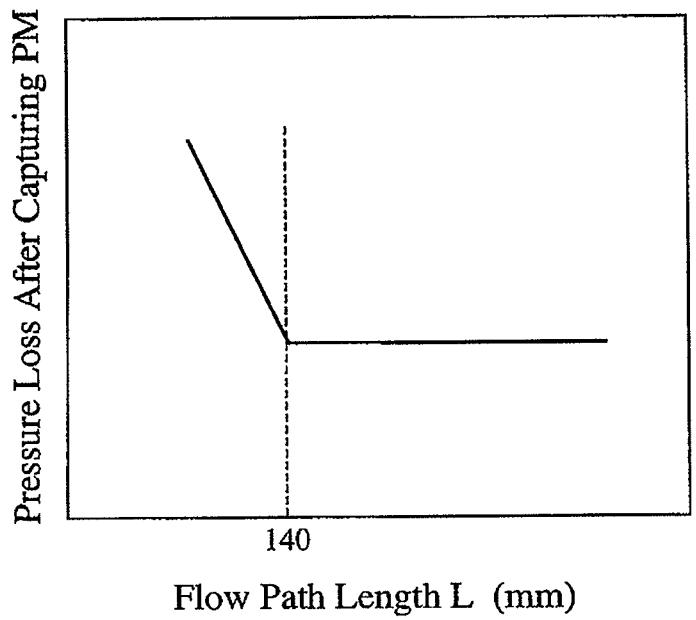
FIG. 6 is a graph showing the relation between flow path length and pressure loss.

The honeycomb filter of the present invention preferably has a flow path length L (mm) of 140 mm or more. The inventors have found that the pressure loss of the honeycomb filter after capturing particulate matter drastically changes when the flow path length L exceeds 140 mm. FIG. 6 schematically shows the relation between the flow path length L and the pressure loss after capturing particulate matter. When L is less than 140 mm, the pressure loss after capturing particulate matter is extremely large.

(9) Distance X Between Outlet-Side End of Inlet-Side Plug and Inlet-Side End of Outlet-Side Plug As shown in FIG. 1, with the distance X (mm) of 120 mm or more between the outlet-side end surface 7a of the inlet-side plugs 6a and the inlet-side end surface 7b of the outlet-side plugs 6b, the honeycomb filter surely has low pressure loss after capturing particulate matter, even when the plugs 6a, 6b are as long as 10 mm or more in a flow path direction, or even when the inlet-side plugs 6a are separate from the exhaust-gas-entering-side end 8.

(10) Oxidation Catalyst

To burn particulate matter efficiently even at a low exhaust gas temperature, the cell walls preferably carry an oxidation catalyst on the surface and in the pores. The oxidation catalyst is preferably a platinum-group metal catalyst. The permeability κ of the catalyst-carrying cell walls is preferably 1 or more, particularly 2 or more. Having porosity of 50% or more, the catalyst-carrying cell walls can have permeability κ of 1 or more. To increase the permeability κ, the amount of catalyst carried per a unit honeycomb filter volume (1 litter) is 6 g or less, preferably 4 g or less. In this case, the cell walls before carrying the catalyst preferably have porosity of 60% or more and permeability κ of 3 or more.

[2] Ceramic Honeycomb Filter

Because the ceramic honeycomb filter of the present invention is used mainly to remove particulate matter from an exhaust gas from diesel engines, materials forming the cell walls and the plugs preferably have excellent heat resistance, preferably being ceramic materials comprising as main crystals at least one selected from the group consisting of cordierite, alumina, mullite, silicon nitride, silicon carbide, aluminum titanate, aluminum nitride and LAS. Among them, a material comprising cordierite as a main crystal is most preferable because it is inexpensive and has excellent heat resistance and corrosion resistance with small thermal expansion. Although the cell walls and the plugs may be formed by different materials, they are preferably formed by the same material to avoid stress due to their difference in a thermal expansion coefficient.

The present invention will be described in detail with reference to Examples below without intension of limitation.

Example 1

Kaolin powder, talc powder, silica powder, alumina powder and aluminum hydroxide powder were mixed to prepare cordierite-forming material powder having a composition of 50% by mass of $SiO_2$, 35% by mass of $Al_2O_3$, and 15% by mass of MgO. This powder was mixed with methylcellulose and hydroxypropyl methylcellulose as binders, and a foamed resin as a lubricant/pore-forming material. After thorough dry-blending, water was added to carry out sufficient kneading to prepare a moldable ceramic material. This moldable material was extrusion-molded and cut to a honeycomb-structure, molded article. This molded article was dried and sintered to produce a cordierite honeycomb structure. This honeycomb structure was provided with plugs 6a, 6b in end portions of flow paths 3, 4, and further with an outer peripheral wall 1, to obtain the honeycomb filter 10 shown in FIG. 1, which had a length L of 360 mm, an outer diameter 2r of 300 mm, a cell wall thickness W of 0.3 mm, a cell wall pitch P of 1.5 mm, and porosity of 60%. The honeycomb filter had permeability κ of 4.6 µm², and a bulk density of 0.4 g/cm³. The permeability κ can be adjusted by controlling the amount of a foamed resin (pore-forming material) added to the moldable material. The exhaust-gas-entering-side end 8 had an opening ratio expressed by [(cell wall pitch P−cell wall thickness W)²/(cell wall pitch P)²]×0.5, which was $1.2^2/1.5^2 \times 0.5 = 32\%$.

Examples 2 to 9

Honeycomb filters were produced in the same manner as in Example 1, except that the flow path length L was changed as shown in Table 1.

With respect to the honeycomb filters of Examples 1 to 9, their $L/A^{0.5}$, κ/W, $L/S^{0.5}$, volumes and bulk densities are shown in Table 1. The honeycomb filter volume is expressed by a relative value assuming that it is 100 in Example 3.

Measurement of Pressure Loss

Carbon powder (particle size: 0.042 µm) was charged from a particulate matter generator into each honeycomb filter through an exhaust-gas-entering-side end 8 at 0.4 g/minute (flow rate of the air: 1 Nm³/minute) for 1 hour. Air at 20° C. was then caused to pass in a flow rate of 10 Nm³/minute through the honeycomb filter, to measure pressure difference between the upstream side and the downstream side (pressure loss) by a pressure loss meter.

Evaluation of Melting Damage

The above carbon powder was supplied to each pressure-loss-measured honeycomb filter at 1.6 g/minute for 1 hour, and the carbon powder was burned with air at 550° C. The honeycomb filter was then evaluated with respect to melting damage by the flowing standards:

Excellent No melting damage was observed.

Good Melting damage was observed but caused no practical problems.

Poor Melting damage was observed.

Measurement of Permeability

Permeability was measured according to the method described in JP 2003-534229 A on each test piece cut out of a cell wall of each honeycomb filter produced under the same conditions as those of the honeycomb filters of Examples 1 to 9.

The pressure loss, the evaluation of melting damage, and the permeability are shown in Table 1. The pressure loss is expressed by a relative value assuming that it is 100 in Example 3.

Examples 10 to 18

The honeycomb filters of Examples 10 to 18 were produced in the same manner as in Example 1, except that the cell wall thickness W, the permeability κ, the flow path length L, the cross section area S of the honeycomb filter, the cell wall pitch P, and the cross section area A of the flow path were changed as shown in Table 1. With respect to these honeycomb filters, the measurement of bulk density, volume and pressure loss, and the evaluation of melting damage were conducted in the same manner as in Example 1. The results are shown in Table 1.

Example 19

A honeycomb filter was produced in the same manner as in Example 3, except that the cell walls had permeability κ of 2.0 with the cell wall thickness W of 0.2 mm, and that 3 g of a platinum catalyst was carried per 1 L of the filter. With respect to this honeycomb filter, the measurement of bulk density, volume and pressure loss, and the evaluation of melting damage were conducted in the same manner as in Example 1. The results are shown in Table 1.

Comparative Example 1

A honeycomb filter was produced in the same manner as in Example 13, except that the filter length L was reduced as shown in Table 1.

Comparative Example 2

A honeycomb filter was produced in the same manner as in Example 13, except that the permeability κ, the filter length L and the cell wall pitch P were changed as shown in Table 1.

Comparative Example 3

A honeycomb filter was produced in the same manner as in Example 3, except that the cell wall thickness W was changed as shown in Table 1.

Comparative Example 4

A honeycomb filter was produced in the same manner as in Example 3, except that the cell wall thickness W and the permeability κ were changed as shown in Table 1.

With respect to the honeycomb filters of Comparative Examples 1 to 4, the measurement of bulk density, pressure loss and permeability, and the evaluation of melting damage were conducted in the same manner as in Example 1. The results are shown in Table 1.

The isostatic strength measurement of the honeycomb filters of Example 3 and Comparative Example 4 revealed that the honeycomb filter of Comparative Example 4 had strength about 50% of that of Example 3.

As is clear from Table 1, because the honeycomb filters of the present invention (Examples 1 to 19) had cell wall thickness of 0.1 to 0.5 mm, and met $125 \leq L/A^{0.5} \leq 360$, and $8 \leq \kappa/$ W≦26.7, their pressure loss was as low as 140 or less. Among them, the honeycomb filters of Examples 1 to 16 and 19 whose cell walls had permeability κ of 2.0 μm² or more had as low pressure loss as 138 or less. The honeycomb filters of Examples 2 to 7 and 14 meeting the relation of 0.75≦L/S^{0.5}≦1.2 were in excellent shapes with small pressure loss and volume.

As compared with Examples within the present invention, the honeycomb filter of Comparative Example 1 having L/A^{0.5} smaller than 125 suffered as large pressure loss as 222. The honeycomb filter of Comparative Example 2 having larger L/A^{0.5} than 360 suffered as large pressure loss as 142, together with melting damage. Comparative Example 3 having larger cell wall thickness W than 0.5 mm had κ/W less than 8.0, suffering as large pressure loss as 157. Although no melting damage was observed in the honeycomb filter of Comparative Example 3, unburned particulate was confirmed presumably because it had as high a bulk density as 0.7 g/cm³. Because Comparative Example 4 having larger κ/W than 26.7 had small isostatic strength as described above, it is not suitable for practical applications.

TABLE 1

| No. | W[1] (mm) | κ[2] (μm²) | L[3] (mm) | S[4] (mm²) | P[5] (mm) | A[6] (mm²) |
|---|---|---|---|---|---|---|
| Example 1 | 0.3 | 4.6 | 360 | 70650 | 1.5 | 1.44 |
| Example 2 | 0.3 | 4.6 | 320 | 70650 | 1.5 | 1.44 |
| Example 3 | 0.3 | 4.6 | 300 | 70650 | 1.5 | 1.44 |
| Example 4 | 0.3 | 4.6 | 280 | 70650 | 1.5 | 1.44 |
| Example 5 | 0.3 | 4.6 | 260 | 70650 | 1.5 | 1.44 |
| Example 6 | 0.3 | 4.6 | 230 | 70650 | 1.5 | 1.44 |
| Example 7 | 0.3 | 4.6 | 200 | 70650 | 1.5 | 1.44 |
| Example 8 | 0.3 | 4.6 | 160 | 70650 | 1.5 | 1.44 |
| Example 9 | 0.3 | 4.6 | 150 | 70650 | 1.5 | 1.44 |
| Example 10 | 0.3 | 4.6 | 360 | 70650 | 1.3 | 1.00 |
| Example 11 | 0.3 | 4.6 | 300 | 53066 | 1.5 | 1.44 |
| Example 12 | 0.3 | 4.6 | 140 | 70650 | 1.3 | 1.00 |
| Example 13 | 0.3 | 2.4 | 360 | 70650 | 1.5 | 1.44 |
| Example 14 | 0.5 | 13.4 | 230 | 70650 | 1.5 | 1.00 |
| Example 15 | 0.3 | 4.6 | 260 | 125600 | 1.5 | 1.44 |
| Example 16 | 0.2 | 2.0 | 360 | 70650 | 1.5 | 1.69 |
| Example 17 | 0.2 | 1.6 | 280 | 70650 | 1.5 | 1.69 |
| Example 18 | 0.1 | 1.0 | 280 | 70650 | 1.0 | 0.81 |
| Example 19 | 0.2 | 2.0 | 300 | 70650 | 1.5 | 1.69 |
| Comparative Example 1 | 0.3 | 2.4 | 120 | 70650 | 1.5 | 1.44 |
| Comparative Example 2 | 0.3 | 2.8 | 370 | 70650 | 1.3 | 1.00 |
| Comparative Example 3 | 0.6 | 4.6 | 300 | 70650 | 1.5 | 0.81 |
| Comparative Example 4 | 0.1 | 3.2 | 300 | 70650 | 1.5 | 1.96 |

| No. | L/A^{0.5} | κ/W | L/S^{0.5} | Pressure Loss[7] | Volume[8] | Bulk Density | Melting Damage |
|---|---|---|---|---|---|---|---|
| Example 1 | 300.0 | 15.3 | 1.35 | 104 | 120 | 0.4 | Excellent |
| Example 2 | 266.7 | 15.3 | 1.20 | 102 | 107 | 0.4 | Excellent |
| Example 3 | 250.0 | 15.3 | 1.13 | 100 | 100 | 0.4 | Excellent |
| Example 4 | 233.3 | 15.3 | 1.05 | 98 | 93 | 0.4 | Excellent |
| Example 5 | 216.7 | 15.3 | 0.98 | 97 | 87 | 0.4 | Excellent |
| Example 6 | 191.7 | 15.3 | 0.87 | 98 | 77 | 0.4 | Excellent |
| Example 7 | 166.7 | 15.3 | 0.75 | 99 | 67 | 0.4 | Excellent |
| Example 8 | 133.3 | 15.3 | 0.60 | 110 | 53 | 0.4 | Excellent |
| Example 9 | 125.0 | 15.3 | 0.56 | 117 | 50 | 0.4 | Excellent |
| Example 10 | 360.0 | 15.3 | 1.35 | 122 | 120 | 0.4 | Excellent |
| Example 11 | 250.0 | 15.3 | 1.30 | 130 | 75 | 0.4 | Excellent |
| Example 12 | 140.0 | 15.3 | 0.53 | 138 | 47 | 0.4 | Excellent |
| Example 13 | 300.0 | 8.0 | 1.35 | 137 | 120 | 0.5 | Excellent |
| Example 14 | 230.0 | 26.7 | 0.87 | 102 | 77 | 0.5 | Excellent |
| Example 15 | 216.7 | 15.3 | 0.73 | 94 | 154 | 0.4 | Excellent |
| Example 16 | 276.9 | 10.0 | 1.35 | 117 | 120 | 0.3 | Excellent |
| Example 17 | 215.4 | 8.0 | 1.05 | 139 | 93 | 0.3 | Excellent |
| Example 18 | 311.1 | 10.0 | 1.05 | 140 | 93 | 0.2 | Excellent |
| Example 19 | 230.8 | 10.0 | 1.13 | 116 | 100 | 0.3 | Excellent |
| Comparative Example 1 | 100.0 | 8.0 | 0.45 | 222 | 40 | 0.5 | Excellent |
| Comparative Example 2 | 370.0 | 9.3 | 1.39 | 142 | 123 | 0.4 | Poor |
| Comparative Example 3 | 333.3 | 7.7 | 1.13 | 157 | 100 | 0.7 | Excellent |
| Comparative Example 4 | 214.3 | 32.0 | 1.13 | 81 | 100 | 0.1 | Good |

Note:
[1] Cell wall thickness.
[2] Permeability.
[3] Flow path length.
[4] Cross section area of the filter.
[5] Cell wall pitch.
[6] Cross section area of the flow path.

Note:
[7] The pressure loss after capturing particulate matter that is expressed by a relative value assuming that it is 100 in Example 3.
[8] The volume is expressed by a relative value assuming that it is 100 in Example 3.

Examples 20 to 23

Honeycomb filters were produced in the same manner as in Example 8, except for changing the cell wall pitch P and the outer diameter of the filter to 1.4 mm and 190 mm, respectively, and changing the flow path length L as shown in Table 2.

Carbon powder (particle size: 0.042 μm) was charged from a particulate matter generator into each honeycomb filter of Examples 20 to 23 through an exhaust-gas-entering-side end 8 at 0.3 g/minute (flow rate of the air: 1 Nm³/minute) for 1 hour. Air at 20° C. was then caused to pass in a flow rate of 10 Nm³/minute through each honeycomb filter, to measure pressure difference between the upstream side and the downstream side (pressure loss) by a pressure loss meter. The results are shown in Table 2. The pressure loss is expressed by a relative value assuming that it is 100 in Example 20.

Comparative Examples 5 TO 7

A honeycomb filter was produced in the same manner as in Example 20, except that the flow path length L was changed.

The pressure loss of the honeycomb filters of Comparative Examples 5 to 7 was measured in the same manner as in Examples 20 to 23. The results are shown in Table 2. The pressure loss is expressed by a relative value assuming that it is 100 in Example 20.

Figure 7:
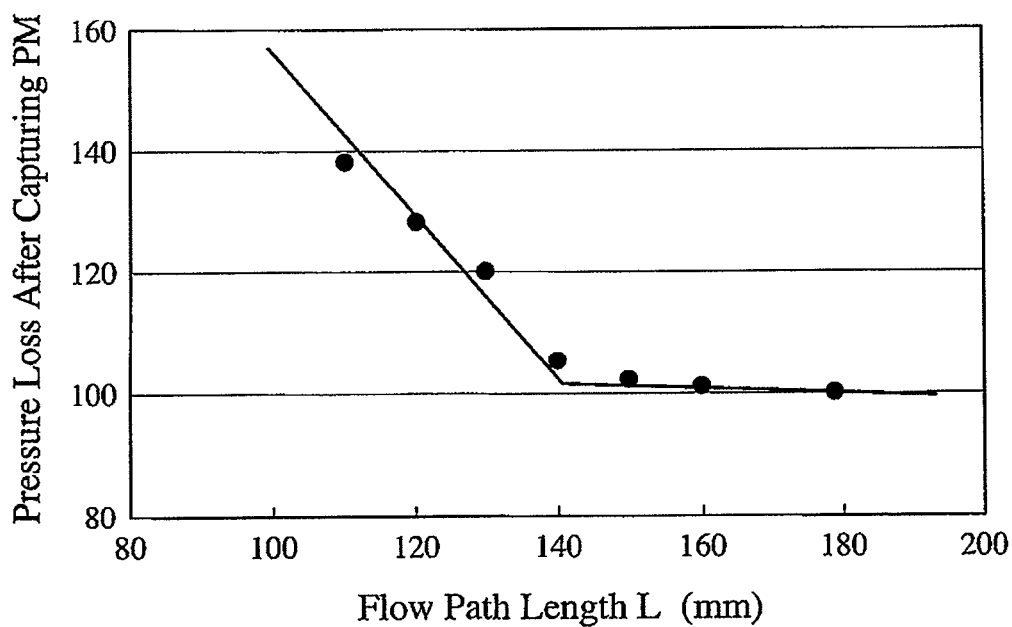
FIG. 7 is a graph showing the relation between flow path length and pressure loss after capturing particulate matter in Examples 20 to 23 and Comparative Examples 5 to 7.

FIG. 7 shows the relation between length L and pressure loss after capturing particulate matter in the honeycomb filters of Examples 20 to 23 and Comparative Examples 5 to 7. As is clear from Table 2 and FIG. 7, the pressure loss after capturing particulate matter was not substantially affected by the length L of the honeycomb filter when the L was 140 mm or more, but the pressure loss after capturing particulate matter rapidly increased as the length L of the honeycomb filter decreased when the L was less than 140 mm.

TABLE 2

| No. | $\kappa^{(1)}$ (μm²) | L (mm) | $X^{(2)}$ (mm) | A (mm²) | $L/A^{0.5}$ | $\kappa/W$ | $L/S^{0.5}$ | Pressure Loss$^{(3)}$ |
|---|---|---|---|---|---|---|---|---|
| Example 20 | 4.6 | 179 | 159 | 1.21 | 162.7 | 15.3 | 1.06 | 100 |
| Example 21 | 4.6 | 160 | 140 | 1.21 | 145.5 | 15.3 | 0.95 | 101 |
| Example 22 | 4.6 | 150 | 130 | 1.21 | 136.4 | 15.3 | 0.89 | 102 |
| Example 23 | 4.6 | 140 | 120 | 1.21 | 127.3 | 15.3 | 0.83 | 105 |
| Comparative Example 5 | 4.6 | 130 | 110 | 1.21 | 118.2 | 15.3 | 0.77 | 120 |
| Comparative Example 6 | 4.6 | 120 | 100 | 1.21 | 109.1 | 15.3 | 0.71 | 128 |
| Comparative Example 7 | 4.6 | 110 | 90 | 1.21 | 100.0 | 15.3 | 0.65 | 138 |

Note:
[1] Permeability.
[2] The distance between the outlet-side end of the inlet-side plug and the inlet-side end of the outlet-side plug.
[3] The pressure loss after capturing particulate matter that is expressed by a relative value assuming that it is 100 in Example 20.

Effects of the Invention

A ceramic honeycomb filter with reduced pressure loss and resistant to melting damage can be obtained by regulating the relation between the cell wall thickness and permeability of the honeycomb filter, and the relation between the cross section area and length of the flow path. The shape parameters of a ceramic honeycomb filter with the minimum pressure loss can also be determined from these relations.

What is claimed is:

1. A ceramic honeycomb filter comprising a honeycomb structure having a large number of flow paths partitioned by porous cell walls; and plugs formed in the flow paths alternately on the exhaust gas inlet and outlet sides; a bulk density of said ceramic honeycomb filter being less than 0.5 g/cm³; the thickness W (mm) and permeability κ (μm²) of the cell wall, the length L (mm) and cross section area A (mm²) perpendicular to the length direction of the flow path, and the length L (mm) and the cross section area S (mm²) perpendicular to the length direction of the honeycomb filter, the meeting the following relations:

$0.1 \leq W \leq 0.5$;

$2 \leq \kappa \leq 8$;

$8 \leq \kappa/W \leq 26.7$;

$125 \leq L/A^{0.5} \leq 360$;

$0.75 \leq L/S^{0.5}$; and wherein a foam resin of a pore-forming material is added to a moldable material to adjust the permeability.

2. The ceramic honeycomb filter according to claim 1, wherein the L and S satisfy the relation of $0.75 \leq L/S^{0.5} \leq 1.2$.

3. The ceramic honeycomb filter according to claim 1, wherein the length L is 140 mm or more.

4. The ceramic honeycomb filter according to claim 1, wherein the distance between an outlet-side end of the inlet-side plug and an inlet-side end of the outlet-side plug is 120 mm or more.

* * * * *